US012723219B2

(12) United States Patent
Patricio et al.

(10) Patent No.: US 12,723,219 B2
(45) Date of Patent: Sep. 1, 2026

(54) HOME CARE COMPOSITIONS

(71) Applicant: Colgate-Palmolive Company, New York, NY (US)

(72) Inventors: Felix Patricio, Mexico City (MX); Henry Pena, Edo México (MX)

(73) Assignee: Colgate-Palmolive Company, New York, NY (US)

( * ) Notice: Subject to any disclaimer, the term of this patent is extended or adjusted under 35 U.S.C. 154(b) by 534 days.

(21) Appl. No.: 18/064,447

(22) Filed: Dec. 12, 2022

(65) Prior Publication Data

US 2023/0193156 A1 Jun. 22, 2023

Related U.S. Application Data

(60) Provisional application No. 63/290,161, filed on Dec. 16, 2021.

(51) Int. Cl.

| | |
|---|---|
| ***C11D 1/12*** | (2006.01) |
| ***C11D 1/14*** | (2006.01) |
| ***C11D 1/29*** | (2006.01) |
| ***C11D 1/34*** | (2006.01) |
| ***C11D 1/66*** | (2006.01) |
| ***C11D 1/72*** | (2006.01) |

(Continued)

(52) U.S. Cl.

CPC .................. *C11D 1/83* (2013.01); *C11D 1/12* (2013.01); *C11D 1/34* (2013.01); *C11D 7/265* (2013.01); *C11D 2111/14* (2024.01)

(58) Field of Classification Search

CPC .... C11D 1/12; C11D 1/14; C11D 1/29; C11D 1/66; C11D 1/662; C11D 1/72; C11D 1/83; C11D 3/042; C11D 3/2086; C11D 3/22; C11D 3/37

See application file for complete search history.

(56) References Cited

U.S. PATENT DOCUMENTS 4,051,234 A 9/1977 Gieske et al.
6,495,506 B1 * 12/2002 Massaux .............. C11D 3/2079 510/505

(Continued)

FOREIGN PATENT DOCUMENTS

CN 107034043 8/2017
DE 102014224747 6/2016

(Continued)

OTHER PUBLICATIONS

B. Boomsma, E. Bikker, E. Lansdaal, P. Stuut* L-Lactic Acid—A Safe Antimicrobial for Home- and Personal Care Formulations. 2015. Sofw Journal. Home & Personal Care ingredients & Formulations, pp. 1-5.

(Continued)

*Primary Examiner* — Brian P Mruk

(57) ABSTRACT

Home care compositions are disclosed herein. According to one aspect, provided is a home care composition that includes a preservative comprising alpha hydroxy acid; and from about 1 to about 25 wt. % of a surfactant system comprising: (i) an anionic surfactant, (ii) a non-ionic surfactant, and (iii) optionally, an amphoteric surfactant; wherein the home care composition has a Micro Robustness Index of 0.85 or greater, and all weight percentages are based on the total weight of the home care composition.

20 Claims, 1 Drawing Sheet

(51) Int. Cl.

| | |
|---|---|
| ***C11D 1/83*** | (2006.01) |
| ***C11D 3/22*** | (2006.01) |
| ***C11D 3/37*** | (2006.01) |
| ***C11D 7/26*** | (2006.01) |

(56) References Cited

U.S. PATENT DOCUMENTS

| | | | | |
|---|---|---|---|---|
| 7,608,573 | B1 | 10/2009 | Scheuing et al. | |
| 7,939,487 | B2 | 5/2011 | Scheuing et al. | |
| 10,517,810 | B2 | 12/2019 | Kocinska et al. | |
| 2011/0180101 | A1 | 7/2011 | Konishi et al. | |
| 2014/0336094 | A1 * | 11/2014 | Gross | C11D 1/83 510/218 |
| 2015/0299621 | A1 | 10/2015 | Peretz et al. | |
| 2017/0319450 | A1 | 11/2017 | Shimohirao et al. | |
| 2020/0296958 | A1 | 9/2020 | Foster et al. | |
| 2020/0315947 | A1 * | 10/2020 | Dewdney | A61K 8/416 |
| 2021/0171866 | A1 * | 6/2021 | Barnabas | C11D 1/72 |

FOREIGN PATENT DOCUMENTS

| | | | | |
|---|---|---|---|---|
| EP | 4039783 | | 8/2022 | |
| WO | 2011/143254 | | 11/2011 | |
| WO | WO 2016/087181 | * | 6/2016 | A61K 31/19 |
| WO | WO-2016087181 A1 | * | 6/2016 | A61K 31/19 |
| WO | 2017/041834 | | 3/2017 | |
| WO | 2017/173240 | | 10/2017 | |
| WO | 2017/173242 | | 10/2017 | |
| WO | 2018/157936 | | 9/2018 | |
| WO | WO 2018/158215 | * | 9/2018 | A61Q 1/14 |
| WO | WO-2018158215 A1 | * | 9/2018 | A61K 8/042 |
| WO | 2018/204355 | | 11/2018 | |
| WO | 2020/069178 | | 4/2020 | |
| WO | 2020/173761 | | 9/2020 | |
| WO | 2022/06054 | | 1/2022 | |
| WO | 2023/114704 | | 6/2023 | |

OTHER PUBLICATIONS

Hawkins, Savannah G., "Antimicrobial Activity of Cinnamic Acid, Citric Acid, Cinnamaldehyde, and Levulinic Acid Against Foodborne Pathogens" (2014). University of Tennessee Honors Thesis Projects, pp. 1-10.

Lin Zhaoa et al. Efficacy of low concentration acidic electrolysed water and levulinic acid combination on fresh organic lettuce (*Lactuca sativa* Var. *Crispa* L.) and its antimicrobial mechanism. Food Control 101, 2019, pp. 241-250.

International Search Report and the Written Opinion of the International Searching Authority issued in International Application PCT/US2022/081338 mailed Apr. 17, 2023.

International Search Report and the Written Opinion of the International Searching Authority issued in International Application PCT/US2023/084275 mailed Mar. 21, 2024.

* cited by examiner

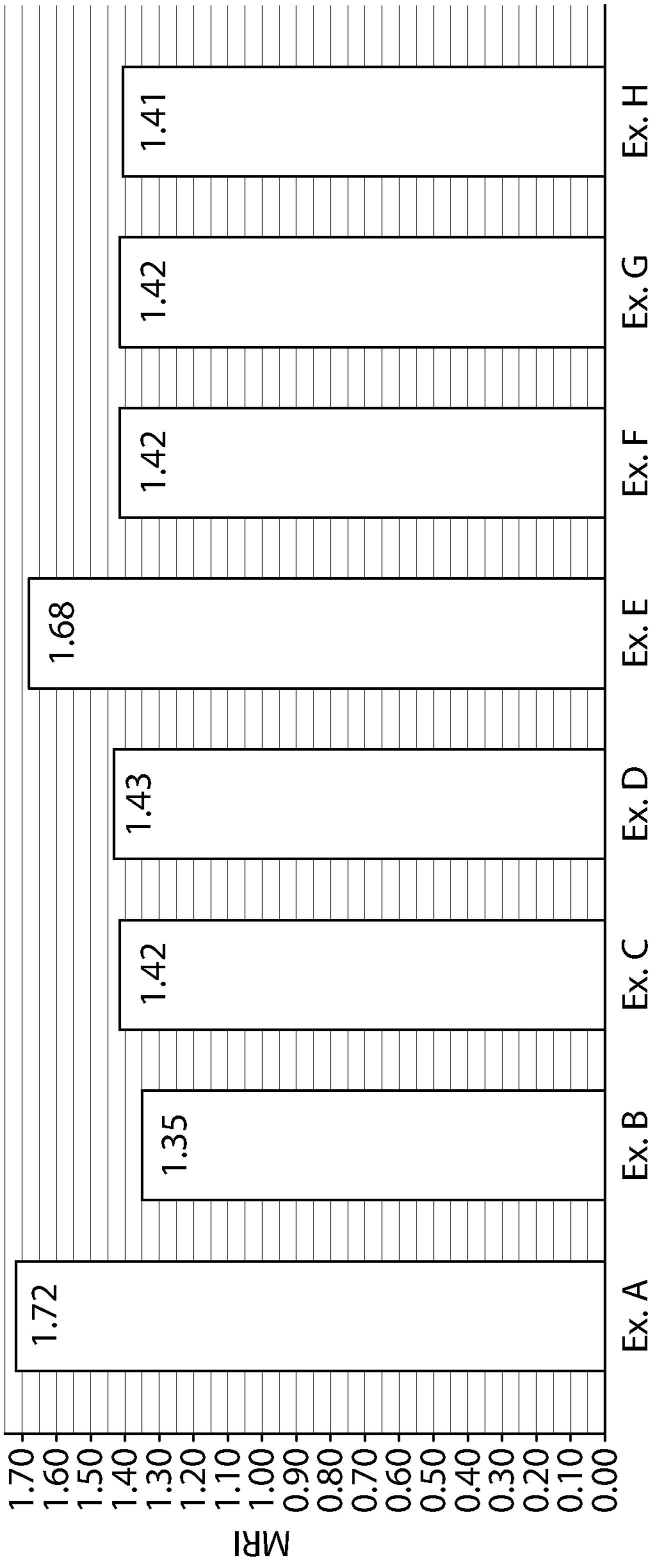
MRI
1.70
1.60
1.50
1.40
1.30
1.20
1.10
1.00
0.90
0.80
0.70
0.60
0.50
0.40
0.30
0.20
0.10
0.00
1.72
1.35
1.42
1.43
1.68
1.42
1.42
1.41
Ex. A
Ex. B
Ex. C
Ex. D
Ex. E
Ex. F
Ex. G
Ex. H

HOME CARE COMPOSITIONS

CROSS-REFERENCE TO RELATED APPLICATION

This application claims the benefit of priority from U.S. Provisional Application No. 63/290,161, entitled "HOME CARE COMPOSITIONS" and filed Dec. 16, 2021, the contents of which is hereby incorporated herein in its entirety.

BACKGROUND

In recent years all-purpose light duty liquid or hard surface cleaning compositions have become widely accepted for cleaning hard surfaces, e.g., dishes, glasses, sinks, painted woodwork and panels, tiled walls, wash bowls, washable wallpaper, etc. Such all-purpose liquids comprise clear and opaque aqueous mixtures of water-soluble organic detergents and water-soluble detergent builder salts.

There is an ongoing need for improved home care products that clean, are mild to human skin, and have improved resistance to bacteria.

BRIEF SUMMARY

In some embodiments, the present invention provides home care compositions that include a preservative comprising alpha hydroxy acid and/or a salt thereof; and from about 1 to about 25 wt. % of a surfactant system comprising: (i) an anionic surfactant, (ii) a non-ionic surfactant, and (iii) optionally, an amphoteric surfactant; wherein the home care composition has a Micro Robustness Index of 0.85 or greater, and all weight percentages are based on the total weight of the home care composition. In at least one embodiment, the alpha hydroxy acid and/or a salt thereof comprises levulinic acid and/or a salt thereof.

BRIEF DESCRIPTION OF THE DRAWING

The features, and advantages of the invention will be apparent from the following more detailed description of certain embodiments of the invention and as illustrated in the accompanying drawings in which:

FIG. 1 depicts a bar graph of microbial growth of bacteria within compositions according to aspects of the invention.

It should be understood that the various aspects are not limited to the compositions, arrangements, and instrumentality shown in the figures.

DETAILED DESCRIPTION

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range. Thus, a range from 1-5, includes specifically 1, 2, 3, 4 and 5, as well as subranges such as 2-5, 3-5, 2-3, 2-4, 1-4, etc.

The term "about" when referring to a number means any number within a range of 10% of the number. For example, the phrase "about 2.0 wt. %" refers to a number between and including 1.8 wt. % and 2.2 wt. %.

All references cited herein are hereby incorporated by reference in their entireties. In the event of a conflict in a definition in the present disclosure and that of a cited reference, the present disclosure controls.

The abbreviations and symbols as used herein, unless indicated otherwise, take their ordinary meaning. The abbreviation "wt. %" means percent by weight with respect to the home care composition. The symbol "°" refers to a degree, such as a temperature degree or a degree of an angle. The symbols "h", "min", "mL", "nm", "μm" means hour, minute, milliliter, nanometer, and micrometer, respectively.

When referring to chemical structures, and names, the symbols "C", "H", and "O" mean carbon, hydrogen, and oxygen, respectively. The symbols "–", "=" and "≡" mean single bond, double bond, and triple bond, respectively.

"Volatile", as used herein, means having a flash point of less than about 100° C. "Non-volatile", as used herein, means having a flash point of greater than about 100° C.

Any member in a list of species that are used to exemplify or define a genus, may be mutually different from, or overlapping with, or a subset of, or equivalent to, or nearly the same as, or identical to, any other member of the list of species. Further, unless explicitly stated, such as when reciting a Markush group, the list of species that define or exemplify the genus is open, and it is given that other species may exist that define or exemplify the genus just as well as, or better than, any other species listed.

All components and elements positively set forth in this disclosure can be negatively excluded from the claims. In other words, the home care compositions of the instant disclosure can be free or essentially free of all components and elements positively recited throughout the instant disclosure. In some instances, the home care compositions of the present invention may be substantially free of non-incidental amounts of the ingredient(s) or compound(s) described herein. A non-incidental amount of an ingredient or compound is the amount of that ingredient or compound that is added into the home care composition by itself. For example, a home care composition may be substantially free of a non-incidental amount of an ingredient or compound, although such ingredient(s) or compound(s) may be present as part of a raw material that is included as a blend of two or more compounds.

Some of the various categories of components identified may overlap. In such cases where overlap may exist and the home care composition includes both components (or the composition includes more than two components that overlap), an overlapping compound does not represent more than one component. For example, certain compounds may be characterized as both an emulsifier and a surfactant. If a particular home care composition includes both an emulsifier and a surfactant, a compound that may be characterized as both an emulsifier and a surfactant will serve only as either an emulsifier or a surfactant—not both.

For readability purposes, the chemical functional groups are in their adjective form; for each of the adjective, the word "group" is assumed. For example, the adjective "alkyl" without a nouns thereafter, should be read as "an alkyl group."

Aspects of the present invention relate to home care compositions and, particularly, home care compositions that provide improved preservative attributes. The home care compositions may, in many instances, provide enhanced cleaning to surfaces, are mild to human skin, and provide an enhanced reduction to bacteria and/or an enhanced inhibition to bacteria growth. In some embodiments, the home care compositions include natural or naturally derived preservatives, such as an alpha hydroxy acid (e.g., levulinic acid), while exhibiting a Micro Robustness Index of 0.85 or greater. For example, the home care composition may have a Micro Robustness Index value of about 0.9 or greater, about 1 or greater, about 1.2 or greater, about 1.4 or greater, about 1.6 or greater, about 1.7 or greater, about 1.75 or greater, about 1.8 or greater, about 1.85 or greater, or about 1.9 or greater.

In some instances, the home care compositions may be substantially free or free of isothizalinones or glutaraldehyde. Preferably, the home care compositions achieve a Micro Robustness Index of 0.85 or greater while being substantially free of or free of isothizalinones and/or glutaraldehyde. For example, the amount of isothizalinones in the home care composition may be about 3 wt. % or less, about 2 wt. % or less, about 1 wt. % or less, about 0.5 wt. % or less, about 0.1 wt. % or less, about 0.05 wt. % or less, about 0.01 wt. % or less, or about 0.001 wt. % or less, based on the total weight of the home care composition. In some embodiments, the home care composition comprises about 0 or 0 wt. % of isothizalinones, based on the total weight of the home care composition. Additionally or alternatively, the amount of glutaraldehyde in home care composition may be about 1 ppm or less, about 0.5 ppm or less, about 0.2 ppm or less, about 0.1 ppm or less, about 0.05 ppm or less, about 0.01 ppm or less, about 0.001 ppm or less, based on the total weight of the home care composition.

In accordance with an aspect of the invention, the home care composition comprises a preservative comprising alpha hydroxy acid and/or a salt thereof; and from about 1 to about 25 wt. % of a surfactant system comprising: (i) an anionic surfactant, (ii) a non-ionic surfactant, and (iii) optionally, an amphoteric surfactant, wherein the home care composition has a Micro Robustness Index of 0.85 or greater, and all weight percentages are based on the total weight of the home care composition.

The home care compositions may have a pH of about 2 to about 13. In some cases, the pH of the home care composition is from about 2 to about 13, about 4 to about 13, about 6 to about 13, about 7 to about 13, about 9 to about 13, about 10 to about 13; about 2 to about 11, about 4 to about 11, about 6 to about 11, about 7 to about 11, about 9 to about 11; about 2 to about 9, about 4 to about 9, about 6 to about 9, about 7 to about 9; about 2 to about 7, about 4 to about 7, about 6 to about 7; about 2 to about 6, about 4 to about 6, about 5 to about 6; about 2 to about 5, about 4 to about 5; about 2 to about 4, about 2 to about 3, about 3 to about 4, or any range or subrange thereof.

Additionally or alternatively, the home care composition may have a viscosity of from about 1 to about 100,000 mPas (cps), such as from about 25 to about 50,000 mPas (cps), about 1 to about 10,000 mPas (cps), or about 1 to about 2,000 mPas (cps), at a temperature of 25° C. and a spindle no. 1 or spindle no. 2 on a Brookfield device. For example, the home care composition may have a viscosity of from about 1 to about 2,000 mPas (cps), about 1 to about 1,500 mPas (cps), about 1 to about 1,000 mPas (cps), about 1 to about 500 mPas (cps); about 500 to about 2,000 mPas (cps), about 500 to about 1,500 mPas (cps), about 500 to about 1,000 mPas (cps); about 1,000 to about 2,000 mPas (cps), about 1,000 to about 1,500 mPas (cps); or about 1,500 to about 2,000 mPas (cps) at a temperature of 25° C. and a spindle no. 1 or spindle no. 2 on a Brookfield device. The Brookfield spindle number for evaluating lower viscosities (e.g., viscosities of 1 to 1,000 cps) is typically spindle no. 2 is typically spindle no. 1, while the Brookfield spindle number for evaluating higher viscosities (e.g., viscosities of 1,001 to 2,000 cps) is typically spindle no. 2.

The home care compositions may be in the form of soaps, surface cleaners (e.g., all-purpose surface cleaners), dish detergents, dishwasher detergents, clothing detergents, hand soaps, window cleaners, and the like. The home care compositions may, in some cases, have an emulsion, such as an oil-in-water or water-in-oil emulsion. Suitable components, such as those listed below, may be included or excluded from the formulations for the home care compositions depending on the specific combination of other components, the form of the home care compositions, and/or the use of the formulation (e.g., to clean hardwood surfaces, tile surfaces, granite surfaces, window glass, pots and pans, dishes, etc.).

The home care compositions include one or more alpha hydroxy acid and/or a salt thereof. The alpha hydroxy acid(s), such as those disclosed herein, may be in the form of a salt. The alpha hydroxy acid and/or a salt thereof may comprise levulinic acid, lactic acid, glycolic acid, malic acid, tartaric acid, citric acid, a salt thereof, or a combination of two or more thereof. Preferably, the home care compositions include levulinic acid and optionally one or more additional preservatives.

The alpha hydroxy acid and/or a salt thereof may be present in the home care composition in an amount of from about 0.01 to about 15 wt. %, based on the total weight of the home care composition. In some embodiments, the alpha hydroxy acid and/or a salt thereof, preferably levulinic acid and/or a salt thereof, is present in the home care composition in an amount of from about 0.01 to about 15 wt. %, about 0.01 to about 10 wt. %, about 0.01 to about 8 wt. %, about 0.01 to about 6 wt. %, about 0.01 to about 4 wt. %, about 0.01 to about 3 wt. %, about 0.01 to about 2 wt. %, about 0.01 to about 1 wt. %; about 0.1 to about 15 wt. %, about 0.1 to about 10 wt. %, about 0.1 to about 8 wt. %, about 0.1 to about 6 wt. %, about 0.1 to about 4 wt. %, about 0.1 to about 3 wt. %, about 0.1 to about 2 wt. %, about 0.1 to about 1 wt. %; about 0.5 to about 15 wt. %, about 0.5 to about 10 wt. %, about 0.5 to about 8 wt. %, about 0.5 to about 6 wt. %, about 0.5 to about 4 wt. %, about 0.5 to about 3 wt. %, about 0.5 to about 2 wt. %, about 0.5 to about 1 wt. %; about 1 to about 15 wt. %, about 1 to about 10 wt. %, about 1 to about 8 wt. %, about 1 to about 6 wt. %, about 1 to about 4 wt. %, about 1 to about 3 wt. %, about 1 to about 2 wt. %; about 2 to about 15 wt. %, about 2 to about 10 wt. %, about 2 to about 8 wt. %, about 2 to about 6 wt. %, about 2 to about 4 wt. %, about 2 to about 3 wt. %; about 3 to about 15 wt. %, about 3 to about 10 wt. %, about 3 to about 8 wt. %, about 3 to about 6 wt. %, about 3 to about 4 wt. %; about 5 to about 15 wt. %, about 5 to about 10 wt. %, about 5 to about 8 wt. %; about 7.5 to about 15 wt. %, about 7.5 to about 10 wt. %; or about 10 to about 15 wt. %, including ranges and subranges thereof, based on the total weight of the home care composition.

The home care compositions may be formulated to include a preservative system comprising a plurality of alpha hydroxy acids and/or salts thereof. For example, the preservative system may comprise 2, 3, 4, 5, 6, 7, or any range thereof, of alpha hydroxy acids and/or salts thereof. The home care composition may include from 2 to 5, 2 to 4, 2 or 3; 3 to 5, 3 or 4, or 4 or 5 of alpha hydroxy acids and/or salts thereof in some cases. Preferably, two or more of the plurality of alpha hydroxy acids are selected from citric acid, lactic acid, glycolic acid, malic acid tartaric acid, levulinic acid, a salt thereof, and a combination of two or more thereof. In some preferred embodiments, at least one of the plurality of alpha hydroxy acids is levulinic acid and/or a salt thereof. In further embodiments, the plurality of alpha hydroxy acids comprises levulinic acid and/or a salt thereof and citric acid and/or a salt thereof.

The home care compositions may be formulated to comprise levulinic acid and/or a salt thereof and another alpha hydroxy acid and/or a salt thereof in a weight ratio from about 3:1 to about 1:5. In some embodiments, the home care compositions have a weight ratio of levulinic acid and/or a salt thereof to another alpha hydroxy acid and/or a salt thereof of from about 3:1 to about 1:5, about 3:1 to about 1:4, about 3:1 to about 1:3, about 3:1 to about 1:2, about 3:1 to about 1:1; about 2:1 to about 1:5, about 2:1 to about 1:4, about 2:1 to about 1:3, about 2:1 to about 1:2, about 2:1 to about 1:1; about 1:1 to about 1:5, about 1:1 to about 1:4, about 1:1 to about 1:3, about 1:1 to about 1:2, about 1:1, or any range or subrange thereof.

Additionally or alternatively, in some embodiments, the home care composition is formulated to be substantially free of or free of lactic acid. For example, in some embodiments, the amount of lactic acid in the home care composition is about 1 wt. % or less, about 0.5 wt. % or less, about 0.3 wt. % or less, about 0.1 wt. % or less, about 0.05 wt. % or less, about 0.01 wt. % or less, about 0.001 wt. % or less, based on the total weight of the home care composition.

One or more preservatives other than alpha hydroxy acid and/or a salt thereof may be incorporated into the home care composition. In some cases, the home care composition has a preservative system comprising two or more preservatives.

Non-limiting examples of preservatives that may be incorporated into the home care composition include, but are not limited to, ethylhexylglycerin, phenoxyethanol, benzyl alcohol, parabens (such as, methylparaben, ethylparaben, propylparaben, butylparaben, isobutylparaben, etc.), sodium benzoate, ethylenediamine-tetraacetic acid (EDTA), disodium EDTA, potassium sorbate, and/or grapefruit seed extract, or combinations thereof. More than one preservative may be included in the composition. Other preservatives include salicylic acid, DMDM hydantoin, formaldahyde, chlorphenism, triclosan, imidazolidinyl urea, diazolidinyl urea, sorbic acid, methylisothiazolinone, sodium dehydroacetate, dehydroacetic acid, Quaternium-15, stearalkonium chloride, zinc pyrithione, sodium metabisulfite, 2-bromo-2-nitropropane, chlorhexidine digluconate, polyaminopropyl biguanide, benzalkonium chloride, sodium sulfite, sodium salicylate, neem oil, essential oils (various), and Vitamin E (tocopherol). In one instance, the cosmetic composition has a plurality of preservatives including or chosen from disodium EDTA, phenoxyethanol, ethylhexylglycerin, tocopheryl acetate, and/or a mixture thereof.

The preservative system may comprise one or more acid and/or a salt thereof other than the alpha hydroxy acid and/or a salt. The one or more acid and/or a salt thereof other than the alpha hydroxy acid and/or a salt may be chosen from sulfonic acid, sulfamic acid, urea hydrochloride acid, phosphoric acid, boric acid, lauric acid, a salt thereof and a combination of two or more thereof. In at least one embodiment, the preservative system comprises sulfonic acid, sulfamic acid, or a combination of two or more thereof.

The amount of preservative(s) other than alpha hydroxy acid(s) and/or a salt(s) may be present in an amount from about 0.1 to about 15 wt. %, based on the total weight of the home care composition. For example, the preservative(s) other than alpha hydroxy acid(s) and/or a salt(s), such as an acid and/or a salt thereof other than the alpha hydroxy acid and/or a salt, may be present in an amount from about 0.1 to about 12 wt. %, about 0.1 to about 10 wt. %, about 0.1 to about 8 wt. %, about 0.1 to about 6 wt. %, about 0.1 to about 5 wt. %, about 0.1 to about 4 wt. %, about 0.1 to about 3 wt. %; about 1 to about 15 wt. %, about 1 to about 12 wt. %, about 1 to about 10 wt. %, about 1 to about 8 wt. %, about 1 to about 6 wt. %, about 1 to about 5 wt. %, about 1 to about 4 wt. %, about 1 to about 3 wt. %; about 3 to about 15 wt. %, about 3 to about 12 wt. %, about 3 to about 10 wt. %, about 3 to about 9 wt. %, about 3 to about 8 wt. %, about 3 to about 7 wt. %, about 3 to about 6 wt. %; about 5 to about 15 wt. %, about 5 to about 12 wt. %, about 5 to about 10 wt. %, about 5 to about 9 wt. %, about 5 to about 8 wt. %; about 7 to about 15 wt. %, about 7 to about 12 wt. %, about 7 to about 10 wt. %, about 7 to about 9 wt. %; about 9 to about 15 wt. %, about 9 to about 12 wt. %; about 11 to about 15 wt. %, including ranges and subranges thereof, based on the total weight of the home care composition.

The home care composition may be formulated to have a preservative system in an amount of about 0.2 to about 25 wt. %, based on the total weight of the home care composition. In some embodiments, the preservative system is present in the home care composition in an amount from about 0.2 to about 25 wt. %, about 0.2 to about 17 wt. %, about 0.2 to about 11 wt. %, about 0.2 to about 6 wt. %, about 0.2 to about 4 wt. %, about 0.2 to about 3 wt. %, about 0.2 to about 2 wt. %, about 0.2 to about 1 wt. %; about 0.4 to about 25 wt. %, about 0.4 to about 17 wt. %, about 0.4 to about 11 wt. %, about 0.4 to about 6 wt. %, about 0.4 to about 4 wt. %, about 0.4 to about 3 wt. %, about 0.4 to about 2 wt. %, about 0.4 to about 1 wt. %; about 0.7 to about 25 wt. %, about 0.7 to about 17 wt. %, about 0.7 to about 11 wt. %, about 0.7 to about 6 wt. %, about 0.7 to about 4 wt. %, about 0.7 to about 3 wt. %, about 0.7 to about 2 wt. %; about 1 to about 25 wt. %, about 1 to about 20 wt. %, about 1 to about 14 wt. %, about 1 to about 11 wt. %, about 1 to about 6 wt. %, about 1 to about 4 wt. %, about 1 to about 3 wt. %, about 1 to about 2 wt. %; about 2 to about 25 wt. %, about 2 to about 20 wt. %, about 2 to about 17 wt. %, about 2 to about 14 wt. %, about 2 to about 11 wt. %, about 2 to about 8 wt. %, about 2 to about 6 wt. %, about 2 to about 4 wt. %, about 2 to about 3 wt. %; about 5 to about 25 wt. %, about 5 to about 20 wt. %, about 5 to about 17 wt. %, about 5 to about 14 wt. %, about 5 to about 11 wt. %, about 5 to about 8 wt. %; about 8 to about 25 wt. %, about 8 to about 20 wt. %, about 8 to about 17 wt. %, about 8 to about 14 wt. %, about 8 to about 11 wt. %; about 12 to about 25 wt. %, about 12 to about 20 wt. %, about 12 to about 17 wt. %; about 16 to about 25 wt. %, about 16 to about 20 wt. %; about 20 to about 25 wt. %, or any range or subrange thereof, based on the total weight of the home care composition.

The surfactant systems disclosed herein typically comprise two or more surfactants selected from anionic surfactants, nonionic surfactants, amphoteric surfactants, zwitterionic surfactants, and combinations of two or more thereof. For instance, the surfactant system may include two or more surfactants, with the two or more surfactants being chosen from different categories of anionic surfactants, nonionic surfactants, amphoteric surfactants, and zwitterionic surfactants. The home care composition may include from 2 to 5, 2 to 4, 2 or 3; 3 to 5, 3 or 4, or 4 or 5 surfactants in some cases.

The home care compositions include one or more anionic surfactant(s) in an amount of, e.g., from about 0.5 to about 20 wt. %, based on the total weight of the home care composition. In some embodiments, the amount of anionic surfactant present in the home care composition is from about 0.5 to about 20 wt. %, about 0.5 to about 15 wt. %, about 0.5 to about 10 wt. %, about 0.5 to about 8 wt. %, about 0.5 to about 6 wt. %, about 0.5 to about 5 wt. %, about 0.5 to about 4 wt. %, about 0.5 to about 3 wt. %, about 0.5 to about 2 wt. %; about 1 to about 20 wt. %, about 1 to about 15 wt. %, about 1 to about 10 wt. %, about 1 to about 8 wt. %, about 1 to about 6 wt. %, about 1 to about 5 wt. %, about 1 to about 4 wt. %, about 1 to about 3 wt. %, about 1 to about 2 wt. %; about 1.5 to about 20 wt. %, about 1.5 to about 15 wt. %, about 1.5 to about 10 wt. %, about 1.5 to about 8 wt. %, about 1.5 to about 6 wt. %, about 1.5 to about 5 wt. %, about 1.5 to about 4 wt. %, about 1.5 to about 3 wt. %, about 1.5 to about 2 wt. %; about 2 to about 20 wt. %, about 2 to about 15 wt. %, about 2 to about 10 wt. %, about 2 to about 8 wt. %, about 2 to about 6 wt. %, about 2 to about 5 wt. %, about 2 to about 4 wt. %; about 4 to about 20 wt. %, about 4 to about 15 wt. %, about 4 to about 10 wt. %, about 4 to about 8 wt. %, about 4 to about 6 wt. %; about 6 to about 20 wt. %, about 6 to about 15 wt. %, about 6 to about 10 wt. %, about 6 to about 8 wt. %, including all ranges and subranges thereof, based on the total weight of the home care composition.

Anionic surfactants that may be useful herein include water-soluble salts of alkyl sulfates and alkyl ether sulfates having from 8 to 20 carbon atoms in the alkyl group (e.g., sodium alkyl sulfate) and water-soluble salts of sulfonated monoglycerides of fatty acids having from 8 to 20 carbon atoms. Sodium laurel ether sulfate (SLES), sodium lauryl sulfate and sodium coconut monoglyceride sulfonates are examples of anionic surfactants of this type. Other suitable anionic surfactants include sarcosinates, such as sodium lauroyl sarcosinate, laurates, sodium lauryl sulfoacetate, sodium lauroyl isethionate, sodium laureth carboxylate, and sodium dodecyl benzenesulfonate. In one embodiment, the anionic surfactant comprises sodium laureth sulfate, sodium lauryl ether sulfate, sodium pareth sulfate, or a combination of two or more thereof.

In one embodiment, the home care composition includes sodium lauryl ether sulfate. The sodium lauryl ether sulfate may have an average ethoxylation of about 1 to about 5 mole per mole of lauryl ether sulfate group. In some instances, the average ethoxylation of the sodium lauryl ether sulfate is about 1 to about 4, about 1 to about 3, about 1 to about 2, or about 1 mole per mole of lauryl ether sulfate group.

Mixtures of anionic surfactants can also be employed. For instance, a variety of anionic surfactants can be utilized in the home care composition including, for example, anionic surfactants having a long chain ($C_6$-$C_{22}$) alkyl group, such as long chain alkyl sulfates, long chain alkyl sulfonates, long chain alkyl phosphates, long chain alkyl ether sulfates, long chain alkyl alpha olefin sulfonates, long chain alkyl taurates, long chain alkyl isethionates (SCI), long chain alkyl glyceryl ether sulfonates (AGES), sulfosuccinates and the like. These anionic surfactants can be alkoxylated, for example, ethoxylated, although alkoxylation is not required. These surfactants are typically highly water soluble as their sodium, potassium, alkyl and ammonium or alkanol ammonium containing salt form and can provide high foaming cleansing power. Other equivalent anionic surfactants may be used in some cases.

The home care compositions may include one or more amphoteric surfactant(s) in an amount that typically ranges from about 0.1 to about 10 wt. %, based on the total weight of the home care composition. For example, the home care composition may include one or more amphoteric surfactant (s) in an amount of from about 0.1 to about 10 wt. %, about 0.1 to about 8 wt. %, 0.1 to about 6 wt. %, about 0.1 to about 5 wt. %, about 0.1 to about 4 wt. %, about 0.1 to about 3 wt. %, about 0.1 to about 2 wt. %, about 0.1 to about 1 wt. %; about 0.5 to about 10 wt. %, about 0.5 to about 8 wt. %, about 0.5 to about 6 wt. %, about 0.5 to about 5 wt. %, about 0.5 to about 4 wt. %, about 0.5 to about 3 wt. %, about 0.5 to about 2 wt. %, about 0.5 to about 1 wt. %; about 0.75 to about 10 wt. %, about 0.75 to about 8 wt. %, about 0.75 to about 6 wt. %, about 0.75 to about 5 wt. %, about 0.75 to about 4 wt. %, about 0.75 to about 3 wt. %, about 0.75 to about 2 wt. %, about 0.75 to about 1 wt. %; about 1 to about 10 wt. %, about 1 to about 8 wt. %, about 1 to about 6 wt. %, about 1 to about 5 wt. %, about 1 to about 4 wt. %, about 1 to about 3 wt. %, about 1 to about 2 wt. %; about 2 to about 10 wt. %, about 2 to about 8 wt. %, about 2 to about 6 wt. %, about 2 to about 5 wt. %, about 2 to about 4 wt. %; about 4 to about 10 wt. %, about 4 to about 8 wt. %, about 4 to about 6 wt. %; about 6 to about 10 wt. %, or about 6 to about 8 wt. %, including ranges and subranges thereof, based on the total weight of the home care composition.

Amphoteric surfactants are typically characterized by a combination of high surfactant activity, lather forming and mildness. The amphoteric surfactant may comprise a substituent containing 8 to 18 carbon atoms and a substituent containing one or more carboxylate, sulfonate, sulfate, phosphate, or phosphonate. The amphoteric surfactant(s) may include, but are not limited to, derivatives of aliphatic secondary and tertiary amines in which the aliphatic radical can be straight chain or branched and wherein one of the aliphatic substituents contains about 8 to about 18 carbon atoms and one contains an anionic water solubilizing group, e.g., carboxy, sulfonate, sulfate, phosphate, or phosphonate. Examples of such compounds include sodium 3-dodecyaminopropionate, sodium 3-dodecylaminopropane sulfonate, N-alkyl taurines and N-higher alkyl aspartic acids. Other equivalent amphoteric surfactants may be used in some cases.

Additional examples of amphoteric surfactants include, but are not limited to, a range of betaines including, for example, high alkyl betaines, such as coco dimethyl carboxymethyl betaine, lauryl dimethyl carboxy-methyl betaine, lauryl dimethyl alpha-carboxyethyl betaine, cetyl dimethyl carboxymethyl betaine, lauryl bis-(2-hydroxyethyl)carboxy methyl betaine, stearyl bis-(2-hydroxypropyl) carboxymethyl betaine, oleyl dimethyl gamma-carboxypropyl betaine, lauryl bis-(2-hydroxypropyl)alpha-carboxyethyl betaine, sulfobetaines (such as coco dimethyl sulfopropyl betaine), stearyl dimethyl sulfopropyl betaine, amido betaines, amidosulfobetaines, and the like. Betaines having a long chain alkyl group, particularly coco, may be particularly useful as are those that include an amido group, such as the cocamidopropyl and cocoamidoethyl betaines. In at least one embodiment, the betaine surfactant is selected from cocamidopropyl betaine, lauryl dimethyl betaine, cetyl dimethyl betaine, cocoamphodiacetate, and a combination of two or more thereof.

Mixtures of amphoteric surfactants can also be employed. Further examples of suitable amphoteric surfactants include sultaines, also known as sulfobetaines, and hydroxy sultaines, for example, cocamidopropyl hydroxysultain. Additional amphoteric surfactants and nonionic surfactants can be found in U.S. Pat. No. 4,051,234, which is incorporated herein in its entirety for all purposes.

The home care compositions may include one or more nonionic surfactant(s) in an amount that typically ranges from about 0.1 to about 10 wt. %, based on the total weight of the home care composition. For instance, the home care composition may include one or more nonionic surfactant(s) in an amount of from about 0.1 to about 10 wt. %, about 0.1 to about 8 wt. %, 0.1 to about 6 wt. %, about 0.1 to about 5 wt. %, about 0.1 to about 4 wt. %, about 0.1 to about 3 wt. %, about 0.1 to about 2 wt. %, about 0.1 to about 1 wt. %; about 0.5 to about 10 wt. %, about 0.5 to about 8 wt. %, about 0.5 to about 6 wt. %, about 0.5 to about 5 wt. %, about 0.5 to about 4 wt. %, about 0.5 to about 3 wt. %, about 0.5 to about 2 wt. %, about 0.5 to about 1 wt. %; about 0.75 to about 10 wt. %, about 0.75 to about 8 wt. %, about 0.75 to about 6 wt. %, about 0.75 to about 5 wt. %, about 0.75 to about 4 wt. %, about 0.75 to about 3 wt. %, about 0.75 to about 2 wt. %, about 0.75 to about 1 wt. %; about 1 to about 10 wt. %, about 1 to about 8 wt. %, about 1 to about 6 wt. %, about 1 to about 5 wt. %, about 1 to about 4 wt. %, about 1 to about 3 wt. %, about 1 to about 2 wt. %; about 2 to about 10 wt. %, about 2 to about 8 wt. %, about 2 to about 6 wt. %, about 2 to about 5 wt. %, about 2 to about 4 wt. %; about 4 to about 10 wt. %, about 4 to about 8 wt. %, about 4 to about 6 wt. %; about 6 to about 10 wt. %, or about 6 to about 8 wt. %, including ranges and subranges thereof, based on the total weight of the home care composition.

The nonionic surfactant may be selected from an alkanolamide, a glucoside, a fatty amine, a polyether, and a combination of two more thereof. For instance, the home care composition may include a glucoside selected from arachidyl glucoside, $C_{12-20}$ alkyl glucoside, caprylyl/capryl glucoside, cetearyl glucoside, coco-glucoside, lauryl glucoside, decyl glucoside, or a combination of two or more thereof. In some instances, the nonionic surfactant is selected from decyl glucoside, PEG-120 methyl glucose dioleate, coco monoethanolamide, bras sica amido propyl dimethyl amine, and a combination of two or more thereof. In further instances, the nonionic surfactant comprises two or more of decyl glucoside, PEG-120 methyl glucose dioleate, coco monoethanolamide, and brassica amido propyl dimethyl amine.

Examples of nonionic surfactants that may, in some cases, be suitably incorporated into the home care composition include and/or may be chosen from alkylphenols and esters of fatty acids, optionally being ethoxylated, propoxylated or glycerolated and having at least one fatty chain comprising, e.g., from 8 to 18 carbon atoms, it being possible for the number of ethylene oxide or propylene oxide groups to range from 2 to 50, and for the number of glycerol groups to range from 1 to 30. Maltose derivatives may also be mentioned. Non-limiting mention may be made of copolymers of ethylene oxide and/or of propylene oxide; condensates of ethylene oxide and/or of propylene oxide with fatty alcohols; polyethoxylated fatty amides comprising, e.g., from 2 to 30 mol of ethylene oxide; polyglycerolated fatty amides comprising, e.g., from 1.5 to 5 glycerol groups, such as from 1.5 to 4; ethoxylated fatty acid esters of sorbitan comprising from 2 to 30 mole of ethylene oxide; ethoxylated oils from plant origin; fatty acid esters of sucrose; fatty acid esters of polyethylene glycol; N—($C_6$-$C_{24}$)alkylglucamine derivatives; amine oxides, such as ($C_{10}$-$C_{14}$)alkylamine oxides and N—($C_{10}$-$C_{14}$)acylaminopropylmorpholine oxides; and a combination of two or more thereof.

The nonionic surfactants may, additionally or alternatively, be chosen from those broadly defined as compounds produced by the condensation of alkylene oxide groups (hydrophilic in nature) with an organic hydrophobic compound, which may be aliphatic or alkyl-aromatic in nature. Other examples of suitable nonionic surfactants include but are not limited to monoethanol amides, including alkyl monoethanolamides, such as cocomonoethanolamide, lauramide monoethanolamide, and the like. Further examples of suitable nonionic surfactants include poloxamers (sold under trade name PLURONIC®), polyoxyethylene, polyoxyethylene sorbitan esters (sold under trade name TWEENS®), Polyoxyl 40 hydrogenated castor oil, fatty alcohol ethoxylates, polyethylene oxide condensates of alkyl phenols, products derived from the condensation of ethylene oxide with the reaction product of propylene oxide and ethylene diamine, ethylene oxide condensates of aliphatic alcohols, alkyl polyglycosides (for example, fatty alcohol ethers of polyglycosides, such as fatty alcohol ethers of polyglucosides, e.g., decyl, lauryl, capryl, caprylyl, myristyl, stearyl and other ethers of glucose and polyglucoside polymers, including mixed ethers such as capryl/caprylyl glucoside, coco glucoside, and lauryl glucoside), long chain tertiary amine oxides, long chain tertiary phosphine oxides, long chain dialkyl sulfoxides, and mixtures of such materials.

Additional examples of nonionic surfactants include polysorbate 20, long chain alkyl glucosides having $C_8$-$C_{22}$ alkyl groups; coconut fatty acid monoethanolamides, such as cocamide MEA; coconut fatty acid diethanolamides, fatty alcohol ethoxylates (alkylpolyethylene glycols); alkylphenol polyethylene glycols; alkyl mercaptan polyethylene glycols; fatty amine ethoxylates (alkylaminopolyethylene glycols); fatty acid ethoxylates (acylpolyethylene glycols); polypropylene glycol ethoxylates (for example the PLURONIC™ block copolymers commercially available from BASF); fatty acid alkylolamides, (fatty acid amide polyethylene glycols); N-alkyl-, N-alkoxypolyhydroxy fatty acid amides; sucrose esters; sorbitol esters; polyglycol ethers; and combinations thereof.

Cationic surfactants can, optionally, be included in the home care composition. The cationic surfactant, when present, is typically included in the home care composition in an amount of from about 0.1 to about 10 wt. %, about 0.1 to about 8 wt. %, 0.1 to about 6 wt. %, about 0.1 to about 5 wt. %, about 0.1 to about 4 wt. %, about 0.1 to about 3 wt. %, about 0.1 to about 2 wt. %, about 0.1 to about 1 wt. %; about 0.5 to about 10 wt. %, about 0.5 to about 8 wt. %, about 0.5 to about 6 wt. %, about 0.5 to about 5 wt. %, about 0.5 to about 4 wt. %, about 0.5 to about 3 wt. %, about 0.5 to about 2 wt. %, about 0.5 to about 1 wt. %; about 0.75 to about 10 wt. %, about 0.75 to about 8 wt. %, about 0.75 to about 6 wt. %, about 0.75 to about 5 wt. %, about 0.75 to about 4 wt. %, about 0.75 to about 3 wt. %, about 0.75 to about 2 wt. %, about 0.75 to about 1 wt. %; about 1 to about 10 wt. %, about 1 to about 8 wt. %, about 1 to about 6 wt. %, about 1 to about 5 wt. %, about 1 to about 4 wt. %, about 1 to about 3 wt. %, about 1 to about 2 wt. %; about 2 to about 10 wt. %, about 2 to about 8 wt. %, about 2 to about 6 wt. %, about 2 to about 5 wt. %, about 2 to about 4 wt. %; about 4 to about 10 wt. %, about 4 to about 8 wt. %, about 4 to about 6 wt. %; about 6 to about 10 wt. %, or about 6 to about 8 wt. %, including ranges and subranges thereof, based on the total weight of the home care composition.

The term "cationic surfactant" means a surfactant that may be positively charged when it is contained in the home care composition. This surfactant may bear one or more positive permanent charges or may contain one or more functional groups that are cationizable in the home care composition according to the disclosure.

The one or more cationic surfactants, if present, may include or be chosen from quaternary ammonium compounds, amidoamines, or a mixture thereof. Examples of cationic surfactants that may be suitable for the home care composition include cetrimonium chloride, steartrimonium chloride, behentrimonium chloride, behentrimonium methosulfate, behenamidopropyltrimonium methosulfate, stearamidopropyltrimonium chloride, arachidtrimonium chloride, distearyldimonium chloride, dicetyldimonium chloride, tricetylmonium chloride, oleamidopropyl dimethylamine, linoleamidopropyl dimethylamine, isostearamidopropyl dimethylamine, oleyl hydroxyethyl imidazoline, stearamidopropyldimethylamine, behenamidopropyldimethylamine, behenamidopropyldiethylamine, behenamidoethyldiethyl-amine, behenamidoethyldimethylamine, arachidamidopropyldimethylamine, arachidamido-propyidiethylamine, arachidamidoethyidiethylamine, arachidamidoethyidimethylamine, or a combination of two or more thereof.

Additional, non-limiting examples of cationic surfactants include: cetyl trimethyl ammonium chloride, stearyl trimethyl ammonium chloride, hydrogenated tallow alkyl trimethyl ammonium chloride, stearyl dimethyl benzyl ammonium chloride, stearyl propyleneglycol phosphate dimethyl ammonium chloride, stearoyl amidopropyl dimethyl benzyl ammonium chloride, stearoyl amidopropyl dimethyl (myristylacetate) ammonium chloride, and N-(stearoyl colamino formyl methy) pyridinium chloride.

Hydrophilically substituted cationic surfactants in which at least one of the substituents contain one or more aromatic, ether, ester, amido, or amino moieties present as substituents or as linkages in the chain may also be in the home care composition. Non-limiting examples of hydrophilically substituted cationic surfactants that may be useful in the home care compositions include the materials having the following INCI designations: quaternium-16, quaternium-26, quaternium-27, quaternium-30, quaternium-33, quaternium-43, quaternium-52, quaternium-53, quaternium-56, quaternium-60, quaternium-61, quaternium-62, quaternium-70, quaternium-71, quaternium-72, quaternium-75, quaternium-76 hydrolyzed collagen, quaternium-77, quaternium-78, quaternium-79 hydrolyzed collagen, quaternium-79 hydrolyzed keratin, quaternium-79 hydrolyzed milk protein, quaternium-79 hydrolyzed silk, quaternium-79 hydrolyzed soy protein, and quaternium-79 hydrolyzed wheat protein, quaternium-80, quaternium-81, quaternium-82, quaternium-83, quaternium-84, or a combination of two or more thereof.

In certain instances, the cationic surfactant is selected from cetrimonium chloride, stearimonium chloride, behentrimonium chloride, behentrimonium methosulfate, behenamidopropyltrimonium methosulfate, stearamidopropyltrimonium chloride, arachidtrimonium chloride, distearyldimonium chloride, dicetyldimonium chloride, tricetylmonium chloride, oleamidopropyl dimethylamine, linoleamidopropyl dimethylamine, isostearamidopropyl dimethylamine, oleyl hydroxyethyl imidazoline, stearamidopropyldimethylamine, behenamidopropyldimethylamine, behenamidopropyldiethylamine, behenamidoethyldiethylamine, behenamidoethyldimethylamine, arachidamidopropyldimethylamine, arachidamido-propyidiethylamine, arachidamidoethyidiethylamine, arachidamidoethyidimethylamine, and a combination of two or more thereof. In some cases, the cationic surfactant is selected from cetrimonium chloride, behentrimonium chloride, and a combination of two or more thereof.

In some cases, the home care compositions may include one or more base(s). The one or more base(s), if present in the home care compositions, are typically in an amount of from about 0.01 to about 5 wt. %, based on the total weight of the home care composition. For example, the home care composition may include one or more base(s) in amount of from about 0.01 to about 4 wt. %, about 0.01 to about 3 wt. %, about 0.01 to about 2 wt. %, about 0.01 to about 1.5 wt. %, about 0.01 to about 1 wt. %, about 0.01 to about 0.5 wt. %; from about 0.05 to about 4 wt. %, about 0.05 to about 4 wt. %, about 0.01 to about 3 wt. %, about 0.05 to about 2 wt. %, about 0.05 to about 1.5 wt. %, about 0.05 to about 1 wt. %, about 0.05 to about 0.5 wt. %; from about 0.1 to about 5 wt. %, about 0.1 to about 4 wt. %, about 0.1 to about 3 wt. %, about 0.1 to about 2 wt. %, about 0.1 to about 1.5 wt. %, about 0.1 to about 1 wt. %, about 0.1 to about 0.5 wt. %; from about 0.5 to about 5 wt. %, about 0.5 to about 4 wt. %, about 0.5 to about 3 wt. %, about 0.5 to about 2 wt. %, about 0.5 to about 1.5 wt. %, about 0.5 to about 1 wt. %; from about 0.75 to about 5 wt. %, about 0.75 to about 4 wt. %, about 0.75 to about 3 wt. %, about 0.75 to about 2 wt. %, about 0.75 to about 1.5 wt. %, about 0.75 to about 1 wt. %; from about 1 to about 5 wt. %, about 1 to about 4 wt. %, about 1 to about 3 wt. %, about 1 to about 2 wt. %; from about 2 to about 5 wt. %, about 2 to about 4 wt. %, about 2 to about 3 wt. %; from about 2.5 to about 5 wt. %, about 2.5 to about 4 wt. %, about 2.5 to about 3 wt. %; from about 3 to about 5 wt. %, about 3 to about 4 wt. %, including ranges and subranges thereof, based on the total weight of the home care composition.

The one or more base(s) may comprise or be selected from sodium hydroxide, triethanolamine, or a combination thereof. Other examples of bases include potassium hydroxide, caustic soda, lye, metal hydroxide, metal hydroxide, and the like.

The home care compositions may comprise one or more fatty acid(s) and/or neutralized derivatives thereof. The amount of fatty acid and/or neutralized derivatives thereof present in the home care composition may be from about 0.1 to about 30 wt. %, based on the total weight of the home care composition. In some embodiments, the amount of fatty acid and/or neutralized derivatives thereof present in the home care composition is from about 0.1 to about 30 wt. %, about 0.1 to about 25 wt. %, about 0.1 to about 20 wt. %, about 0.1 to about 15 wt. %, about 0.1 to about 10 wt. %, about 0.1 to about 8 wt. %, about 0.1 to about 6 wt. %, about 0.1 to about 5 wt. %, about 0.1 to about 4 wt. %, about 0.1 to about 3 wt. %, about 0.1 to about 2 wt. %; about 0.5 to about 30 wt. %, about 0.5 to about 25 wt. %, about 0.5 to about 20 wt. %, about 0.5 to about 15 wt. %, about 0.5 to about 10 wt. %, about 0.5 to about 8 wt. %, about 0.5 to about 6 wt. %, about 0.5 to about 5 wt. %, about 0.5 to about 4 wt. %, about 0.5 to about 3 wt. %, about 0.5 to about 2 wt. %; about 1 to about 30 wt. %, about 1 to about 25 wt. %, about 1 to about 20 wt. %, about 1 to about 15 wt. %, about 1 to about 10 wt. %, about 1 to about 8 wt. %, about 1 to about 6 wt. %, about 1 to about 5 wt. %, about 1 to about 4 wt. %, about 1 to about 3 wt. %, about 1 to about 2 wt. %; about 1.5 to about 30 wt. %, about 1.5 to about 25 wt. %, about 1.5 to about 20 wt. %, about 1.5 to about 15 wt. %, about 1.5 to about 10 wt. %, about 1.5 to about 8 wt. %, about 1.5 to about 6 wt. %, about 1.5 to about 5 wt. %, about 1.5 to about 4 wt. %, about 1.5 to about 3 wt. %, about 1.5 to about 2 wt. %; about 2 to about 30 wt. %, about 2 to about 25 wt. %, about 2 to about 20 wt. %, about 2 to about 15 wt. %, about 2 to about 10 wt. %, about 2 to about 8 wt. %, about 2 to about 6 wt. %, about 2 to about 5 wt. %, about 2 to about 4 wt. %; about 4 to about 30 wt. %, about 4 to about 25 wt. %, about 4 to about 20 wt. %, about 4 to about 15 wt. %, about 4 to about 10 wt. %, about 4 to about 8 wt. %, about 4 to about 6 wt. %; about 6 to about 30 wt. %, about 6 to about 25 wt. %, about 6 to about 20 wt. %, about 6 to about 15 wt. %, about 6 to about 10 wt. %, about 6 to about 8 wt. %, including all ranges and subranges thereof, based on the total weight of the home care composition The one or more fatty acids may, in some cases, comprise or consists of myristic acid, lauric acid, palmitic acid, stearic acids, and other fatty acids. Sources of fatty acids include coconut oil, palm oil, palm kernel oil, tallow, avocado, canola, corn, cottonseed, olive, high-oleic sunflower, mid-oleic sunflower, sunflower, palm stearin, palm kernel olein, safflower, and babassu oils.

The fatty acids can be neutralized with a neutralizing agent, such as base, including those described herein. Typical bases include, but are not limited to, sodium hydroxide, potassium hydroxide, and triethanolamine. In certain embodiments, the home care composition is formed from fatty acids neutralized by two or more bases. In certain embodiments, the bases are sodium hydroxide and triethanolamine. In certain embodiments, the molar ratio of sodium hydroxide and triethanolamine is from about 4:1 to about 1:4, about 3:1 to about 1:3, or about 2:1 to about 1:2. In at least one embodiment, the home care composition has a molar ratio of sodium hydroxide to triethanolamine of about 1:1.

Additionally or alternatively, the home care composition may include a fatty acid comprising stearic acid and an acid comprising lauric acid. In certain embodiments, the amount of stearic acid based on a total weight of starting fatty acid is 60 wt. %, and the amount of lauric acid based on a total weight of starting acid is 40 wt. %. In certain embodiments, the molar amount of fatty acids is greater than the molar amount of neutralizing agent, such that fatty acid remains in the composition.

The fatty acid may be neutralized with neutralizing agents selected from alkali metal carbonates, alkali metal phosphates, organic amines, hydroxide base compounds, and mixtures thereof, and particularly from, e.g., organic amines, alkali metal hydroxides, alkali earth metal hydroxides, and mixtures thereof. Organic amines may be selected from amino-2-methyl-1-propanol (or aminomethyl propanol), ethylamines, ethyleneamines, alkanolamines, cyclic amines and other cyclic compounds, saturated or unsaturated, having one or more nitrogen atoms within the ring, and mixtures thereof. The organic amines may be chosen from ones having a pKb at a temperature of 25° C. of less than 12, such as less than 10 or less than 6. It should be noted that this is the pKb corresponding to the function of highest basicity.

Non-limiting examples of organic amines include organic amines comprising one or two primary, secondary, or tertiary amine functions, and at least one linear or branched $C_1$-$C_8$ alkyl groups bearing at least one hydroxyl radical. Organic amines may also be chosen from alkanolamines, such as mono-, di- or trialkanolamines, comprising one to three identical or different $C_1$-$C_4$ hydroxyalkyl radicals, ethylamines, ethyleneamines, quinoline, aniline and cyclic amines, such as pyrroline, pyrrole, pyrrolidine, imidazole, imidazolidine, imidazolidinine, morpholine, pyridine, piperidine, pyrimidine, piperazine, triazine and derivatives thereof. Examples of compounds of the alkanolamine type include, but are not limited to: monoethanolamine (also known as monoethanolamine or MEA), diethanolamine, triethanolamine, monoisopropanolamine, diisopropanolamine, N-dimethylaminoethanolamine, 2-amino-2-methyl-1-propanol, triisopropanolamine, 2-amino-2-methyl-1,3-propanediol, 3-amino-1,2-propanediol, 3-dimethylamino-1,2-propanediol, 2-amino-2-methyl-1-propanol, and tris(hydroxymethylamino)methane. Other examples include, but are not limited to: 1,3-diaminopropane, 1,3-diamino-2-propanol, spermine, and spermidine.

In some cases, the home care composition may include a structuring agent. The structuring agent may be included in the home care compositions in an amount from about 0.1 to 20 wt. %, based on the total weight of the home care composition. For example, the structuring agent may be present in the home care composition in an amount of from about 0.1 to 20 wt. %, about 0.1 to 15 wt. %, about 0.1 to 10 wt. %, about 0.1 to 8 wt. %, about 0.1 to 6 wt. %, about 0.1 to 5 wt. %, about 0.1 to 4 wt. %, about 0.1 to 3 wt. %, about 0.1 to 2 wt. %; about 1 to 20 wt. %, about 1 to 15 wt. %, about 1 to 10 wt. %, about 1 to 8 wt. %, about 1 to 6 wt. %, about 1 to 5 wt. %, about 1 to 4 wt. %, about 1 to 3 wt. %, about 1 to 2 wt. %; about 2 to 20 wt. %, about 2 to 15 wt. %, about 2 to 10 wt. %, about 2 to 8 wt. %, about 2 to 6 wt. %, about 2 to 5 wt. %, about 2 to 4 wt. %; about 4 to 20 wt. %, about 4 to 15 wt. %, about 4 to 10 wt. %, about 4 to 8 wt. %, about 4 to 6 wt. %; about 6 to 20 wt. %, about 6 to 15 wt. %, about 6 to 10 wt. %, about 6 to 8 wt. %; about 8 to 20 wt. %, about 8 to 15 wt. %, about 8 to 10 wt. %; about 10 to 20 wt. %, or about 10 to 15 wt. %, including ranges and subranges thereof, based on the total weight of the home care composition.

Typically, structuring agents can increase the viscosity or yield point in the home care composition. Thus, many of the structuring agents disclosed herein may also be categorized and referred herein to as thickening agents. Examples of the structuring agent include, but are not limited to, clay, polymers, polymeric gums, polysaccharides, microfibrous cellulose, gellan gum, pectine, alginate, arabinogalactan, carageenan, xanthum gum, guar gum, rhamsan gum, furcellaran gum, and other natural gums.

A polymer structuring agent in one embodiment is a polyacrylate. Examples of polyacrylates are the Aculyn™ polymers from Dow/Rohm and Haas. In one embodiment, the structuring agent is Aculyn™ 88 acrylates/steareth-20 methacrylate crosspolymer, which is sold as a 29 wt. % polymer in water composition. In one embodiment, the Aculyn™ 88 acrylates/steareth-20 methacrylate crosspolymer is present in an amount of 0.2 to 0.6 wt. % (active weight). Non-limiting examples, of polymers that may be included as structuring agents, solely or in conjunction with other structuring agents, include polyvinyl pyrrolidone, carbomers (e.g., carboxyvinyl polymers), carrageenans (e.g., Irish moss, carrageenan, iota-carrageenan, etc.), high molecular weight polyethylene glycols (e.g., CARBOWAX, which is commercially available from The Dow Chemical Company of Midland, Mich.), cellulosic polymers, hydroxyethylcellulose, carboxymethylcellulose, and salts thereof (e.g., CMC sodium), natural gums (e.g., karaya, xanthan, gum arabic, and tragacanth), colloidal magnesium aluminum silicate, and the like, and mixtures or combinations of two or more thereof Examples of other acrylates are manufactured by Noveon, such as CARBOPOL™ Aqua 30, Aqua SF1, and Aqua SF2. The CARBOPOL™ resins, also known as CARBOMER™, are hydrophilic high molecular weight, crosslinked acrylic acid polymers having an average equivalent weight of 76, and the general structure illustrated by the following formula has a molecular weight of about 1,250,000; CARBOPOL™ 940 with a molecular weight of approximately 4,000,000 and CARBOPOL™ 934 with a molecular weight of approximately 3,000,000. The CARBOPOL™ resins can be crosslinked with polyalkenyl polyether, e.g. about 1% of a polvalkyl ether of sucrose having an average of about 5, 8 alkyl groups for each molecule of sucrose. The structuring agent may, optionally, comprise gums, sucrose esters, polyvinylpyrrolidone (PVP) and co-polymers thereof, celluloses, polyquaternium compounds, and carboxylic acid or carboxylate based homopolymer or co-polymer thereof, which can be linear or crosslinked.

The home care compositions may, in some embodiments, include one or more polyol(s). For example, the one or more polyol(s) may be present in the home care composition in an amount of from about 0.1 to about 20 wt. %, based on the total weight of the home care composition. In some instances, the home care compositions include one or more polyol(s) in an amount of about 0.1 to about 20 wt. %, about 0.1 to about 18 wt. %, about 0.1 to about 16 wt. %, about 0.1 to about 14 wt. %, about 0.1 to about 12 wt. %, about 0.1 to about 10 wt. %, about 0.1 to about 8 wt. %, about 0.1 to about 6 wt. %, about 0.1 to about 4 wt. %; about 0.5 to about 20 wt. %, about 0.5 to about 18 wt. %, about 0.5 to about 16 wt. %, about 0.5 to about 14 wt. %, about 0.5 to about 12 wt. %, about 0.5 to about 10 wt. %, about 0.5 to about 8 wt. %, about 0.5 to about 6 wt. %, about 0.5 to about 4 wt. %; about 1 to about 20 wt. %, about 1 to about 18 wt. %, about 1 to about 16 wt. %, about 1 to about 14 wt. %, about 1 to about 12 wt. %, about 1 to about 10 wt. %, about 1 to about 8 wt. %, about 1 to about 6 wt. %, about 1 to about 4 wt. %; about 2 to about 20 wt. %, about 2 to about 18 wt. %, about 2 to about 16 wt. %, about 2 to about 14 wt. %, about 2 to about 12 wt. %, about 2 to about 10 wt. %, about 2 to about 8 wt. %, about 2 to about 6 wt. %, about 2 to about 4 wt. %; about 4 to about 20 wt. %, about 4 to about 18 wt. %, about 4 to about 16 wt. %, about 4 to about 14 wt. %, about 4 to about 12 wt. %, about 4 to about 10 wt. %, about 4 to about 8 wt. %, or about 4 to about 6 wt. %, including ranges and subranges thereof, based on the total weight of the home care composition.

The term "polyol" should be understood as meaning, within the meaning of the present disclosure, an organic molecule comprising at least two free hydroxyl groups. The polyols of the home care composition may be glycols or compounds with numerous hydroxyl groups. In some cases, the one or more polyols is/are selected from the group consisting of $C_2$-$C_{32}$ polyols. The one or more polyols may be liquid at ambient temperature (25° C.). The one or more polyols may have from 2 to 32 carbon atoms, from 3 to 16 carbon atoms, or from 3 to 12 carbon atoms.

Polyols that may be included in the home care composition, in certain instances, include ethylene glycol, propylene glycol, butylene glycol, hexylene glycol, glycerin, diglycerin, diethylene glycol, and dipropylene glycol, and mixtures thereof. In some cases, the polyol is propylene glycol. In some further cases, the polyol is one or both of propylene glycol and butylene glycol. Additionally, in some cases, the home care composition comprises at least propylene glycol, and optionally one or more polyols other than propylene glycol.

Non-limiting examples of polyols that may, optionally, be included in the home care include and/or may be chosen from alkanediols such as glycerin, 1,2,6-hexanetriol, trimethylolpropane, ethylene glycol, propylene glycol, butylene glycol, pentylene glycol, hexylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, caprylyl glycol, 1,2-hexanediol, 1,2-pentanediol, and 4-methyl-1,2-pentanediol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, sorbitol, sorbitan, triacetin, and a mixture thereof.

The one or more polyols may, optionally, be glycols or glycol ethers such as, e.g., monomethyl, monoethyl and monobutyl ethers of ethylene glycol, propylene glycol or ethers thereof such as, e.g., monomethyl ether of propylene glycol, butylene glycol, hexylene glycol, dipropylene glycol as well as alkyl ethers of diethylene glycol, e.g., monoethyl ether or monobutyl ether of diethylene glycol. In some cases, the one or more polyols may include or are chosen from ethylene glycol, propylene glycol, butylene glycol, hexylene glycol, pentylene glycol, 1,3-propanediol, diethylene glycol, dipropylene glycol, 1,4-butanediol, 1,5-pentanediol, hexane-1,6-diol, glycerin, diglycerin, caprylyl glycol, and a mixture thereof.

The home care compositions may be aqueous and, e.g., include water in an amount from about 1 to about 95 wt. %, based on the total weight of the home care composition. For example, the water may be present in the home care composition in an amount from about 5 to about 95 wt. %, about 10 to about 95 wt. %, about 15 to about 95 wt. %, about 20 to about 95 wt. %, about 30 to about 95 wt. %, about 40 to about 95 wt. %, about 50 to about 95 wt. %, about 60 to about 95 wt. %, about 70 to about 95 wt. %, about 80 to about 95 wt. %, about 90 to about 95 wt. %; about 5 to about 90 wt. %, about 10 to about 90 wt. %, about 15 to about 90 wt. %, about 20 to about 90 wt. %, about 30 to about 90 wt. %, about 40 to about 90 wt. %, about 50 to about 90 wt. %, about 60 to about 90 wt. %, about 70 to about 90 wt. %, about 80 to about 90 wt. %; about 5 to about 80 wt. %, about 10 to about 80 wt. %, about 15 to about 80 wt. %, about 20 to about 80 wt. %, about 30 to about 80 wt. %, about 40 to about 80 wt. %, about 50 to about 80 wt. %, about 60 to about 80 wt. %, about 70 to about 80 wt. %; about 5 to about 70 wt. %, about 10 to about 70 wt. %, about 15 to about 70 wt. %, about 20 to about 70 wt. %, about 30 to about 70 wt. %, about 40 to about 70 wt. %, about 50 to about 70 wt. %, about 60 to about 70 wt. %; about 5 to about 60 wt. %, about 10 to about 60 wt. %, about 15 to about 60 wt. %, about 20 to about 60 wt. %, about 30 to about 60 wt. %, about 40 to about 60 wt. %, about 50 to about 60 wt. %; about 5 to about 50 wt. %, about 10 to about 50 wt. %, about 15 to about 50 wt. %, about 20 to about 50 wt. %, about 30 to about 50 wt. %, about 40 to about 50 wt. %, including any ranges and subranges therebetween, based on the total weight of the home care composition.

Additional ingredients may be present in the home care composition. The additional ingredients may include, for example, ingredients to preserve, emulsify, add fragrance, stabilize (e.g., chelating agents), adjust the pH, and color. The home care compositions may include any of the following additional ingredients in an amount of from about 0.01 to about 5 wt. %, based on the total weight of the home care composition. In some instances, the amount of additional ingredients present in the home care composition is from about 0.01 to about 4 wt. %, about 0.01 to about 3 wt. %, about 0.01 to about 2 wt. %, about 0.01 to about 1 wt. %, about 0.01 to about 0.5 wt. %, about 0.01 to about 0.1 wt. %; about 0.1 to about 5 wt. %, about 0.1 to about 4 wt. %, about 0.1 to about 3 wt. %, about 0.1 to about 2 wt. %, about 0.1 to about 1 wt. %, about 0.1 to about 0.5 wt. %, about 0.1 to about 0.1 wt. %; about 0.5 to about 5 wt. %, about 0.5 to about 4 wt. %, about 0.5 to about 3 wt. %, about 0.5 to about 2 wt. %, about 0.5 to about 1 wt. %; about 0.75 to about 5 wt. %, about 0.75 to about 4 wt. %, about 0.75 to about 3 wt. %, about 0.75 to about 2 wt. %, about 0.75 to about 1 wt. %; about 1 to about 5 wt. %, about 1 to about 4 wt. %, about 1 to about 3 wt. %, about 1 to about 2 wt. %; about 2 to about 5 wt. %, about 2 to about 4 wt. %, about 2 to about 3 wt. %; about 3 to about 5 wt. %, about 3 to about 4 wt. %, including any range or subrange therebetween, based on the total weight of the home care composition.

Non-limiting examples of fragrances and perfumes include odor compounds selected from: 7-acetyl-1,2,3,4,5,6,7,8-octahydro-1,1,6,7-tetramethylnaphthalene, α-ionone, β-ionone, γ-ionone α-isomethylionone, methylcedrylone, methyl dihydrojasmonate, methyl 1,6,10-trimethyl-2,5,9-cyclododecatrien-1-yl ketone, 7-acetyl-1,1,3,4,4,6-hexamethyltetralin, 4-acetyl-6-tert-butyl-1,1-dimethylindane, hydroxyphenylbutanone, benzophenone, methyl β-naphthyl ketone, 6-acetyl-1,1,2,3,3,5-hexamethylindane, 5-acetyl-3-isopropyl-1,1,2,6-tetramethylindane, 1-dodecanal, 4-(4-hydroxy-4-methylpentyl)-3-cyclohexene-1-carboxaldehyde, 7-hydroxy-3,7-dimethyloctanal, 10-undecen-1-al, isohexenylcyclohexylcarboxaldehyde, formyltricyclodecane, condensation products of hydroxycitronellal and methyl anthranilate, condensation products of hydroxycitronellal and indole, condensation products of phenylacetaldehyde and indole, 2-methyl-3-(para-tert-butylphenyl)propionaldehyde, ethylvanillin, heliotropin, hexylcinnamaldehyde, amylcinnamaldehyde, 2-methyl-2-(isopropylphenyl)propionaldehyde, coumarin, γ-decalactone, cyclopentadecanolide, 16-hydroxy-9-hexadecenoic acid lactone, 1,3,4,6,7,8-hexahydro-4,6,6,7,8,8-hexamethylcyclopenta-γ-2-benzopyran, β-naphthol methyl ether, ambroxane, dodecahydro-3a,6,6,9a-tetramethylnaphtho[2,1b]furan, cedrol, 5-(2,2,3-trimethylcyclopent-3-enyl)-3-methylpentan-2-ol, 2-ethyl-4-(2,2,3-trimethyl-3-cyclopenten-1-yl)-2-buten-1-ol, caryophyllene alcohol, tricyclodecenyl propionate, tricyclodecenyl acetate, benzyl salicylate, cedryl acetate, tert-butylcyclohexyl acetate, and combinations of two or more thereof.

Other fragrances may include odor compounds selected from essential oils, resinoids and resins from a large number of sources, such as, for example, Peru balsam, olibanum resinoid, styrax, labdanum resin, nutmeg, cassia oil, benzoin resin, coriander, and lavandin.

Further suitable fragrances include odor compounds selected from phenylethyl alcohol, terpineol, linalool, linalyl acetate, geraniol, nerol, 2-(1,1-dimethylethyl)cyclo-hexanol acetate, benzyl acetate, and eugenol. The fragrances or perfumes can be used as single substances or in a mixture with one another.

The home care composition may further comprise one or more colorants. The colorants may be a pigment, a dye, or mixtures thereof. Non-limiting examples of pigments include titanium dioxide, zinc oxide, kaolin, mica etc. Non-limiting examples of dyes include food dyes suitable for food, drug and cosmetic applications, and mixtures thereof. Some color agents (colorants) are known as FD&C dyes.

The colorants may be present in an amount ranging from about 0.0001 wt. % to about 0.4 wt. %, including all percentages and subranges therebetween, based on the total weight of the home care composition. In some embodiments, the colorants may be present in an amount ranging from about 0.0001 wt. % to about 4 wt. %, including all percentages and subranges therebetween, based on the total weight of the home care composition.

Non-limiting examples of chemical chelating agents include aminotrimethyl phosphonic acid, β-alanine diacetic acid, cyclodextrin, cyclohexanediamine tetracetic acid, diethylenetriamine pentamethylene phosphonic acid, diethanolamine N-acetic acid, ethylene diamine tetracetic acid (EDTA or $YH_4$) and its sodium ($YH_3Na$, $Y_2H_2Na_2$, $YHNa_3$ and $YNa_4$), potassium ($YH_3K$, $Y_2H_3K_3$ and $YK_4$), calcium disodium, diammonium salts and its salts with triethanolamine (TEA-EDTA), etidronic acid, galactanic acid, hydroxyethyl ethylenediamine tetracetic acid (HEDTA) and its trisodium salt, gluconic acid, glucuronic acid, nitrilotriacetic acid (NTA) and its trisodium salt, pentetic acid, phytic acid, ribonic acid, diammonium citrate, disodium azacycloheptane diphosphonate, disodium pyrophoshate, hydroxypropyl cyclodextrin, methyl cyclodextrin, pentapotassium triphosphate, pentasodium aminotrimethylene phosphonate, pentasodium ethylenediamine tetramethylene phosphonate, pentasodium pentetate, pentasodium triphosphate, potassium citrate, potassium EDTMP, sodium EDTMP, sodium chitosan methylene phosphonate, sodium hexametaphosphate, sodium metaphosphate, potassium polyphosphate, sodium polyphosphate, sodium trimetaphosphate, sodium dihydroxyethylglycinate, potassium gluconate, sodium gluconate, sodium glucopeptate, sodium glycereth-1 polyphosphate, tetrapotassium pyrophosphate, triethanolamine polyphosphate (TEA), tetrasodium pyrophosphate, trisodium phosphate, potassium triphosphonomethylamine oxide, sodium metasilicate, sodium phytate, sodium polydimethylglycinophenolsulfonate, tetrahydroxyethyl ethylene diamine, tetrahydroxypropyl ethylene diamine, tetrapotassium etidronate, tetrasodium etidronate, tetrasodium iminodisuccinate, trisodium ethylenediamine disuccinate, ethanolamine N,N-diacetic acid, disodium acetate, dimercaprol, deferoxamine, zylox, and combinations of two or more thereof. Examples of iron chelating agent include those disclosed and claimed in the international patent application WO 94/61338, which is incorporated herein in its entirety for all purposes. Examples of biological chelating agents include metallothionein, transferrin, calmodulin, and sodium chitosan methylene phosphonate.

The home care composition may include one or more pH adjusters to increase or decrease the overall pH of the home care composition. For example, one or more acids may be included to decrease the pH of the home care composition. Examples of suitable acids for decreasing the pH of the home care composition include, but are not limited to, citric acid, acetic acid, and the like. The home care composition may include one or more bases, such as sodium hydroxide, potassium hydroxide and the like, to increase the pH of the home care composition.

Non-limiting embodiments of the personal care composition are described below.

In accordance with a first embodiment, provided is a home care composition comprising:

a preservative system comprising an alpha hydroxy acid and/or a salt thereof; and from about 1 to about 25 wt. % of a surfactant system comprising:

(i) an anionic surfactant, (ii) a non-ionic surfactant, and (iii) optionally, an amphoteric surfactant;

wherein the home care composition has a Micro Robustness Index of 0.85 or greater, and all weight percentages are based on the total weight of the home care composition.

According to a second embodiment, the home care composition of the first embodiment further comprising: from about 0.01 to about 2 wt. % of a base.

According to a third embodiment, the home care composition of the second embodiment, wherein the base is selected from sodium hydroxide, triethanolamine, or a combination thereof.

According to a fourth embodiment, the home care composition of any foregoing embodiment further comprising: from about 0.1 to about 30 wt. % of a fatty acid and/or a neutralized derivative thereof.

According to a fifth embodiment, the home care composition of the fourth claim, wherein the fatty acid is selected from a fatty acid, optionally, linear or branched carbon chain, comprising 10 to 50 carbon atoms and/or a neutralized derivative thereof.

According to a sixth embodiment, the home care composition of the fourth or fifth embodiment, wherein the fatty acid is a $C_{14}$-$C_{20}$ fatty acid and/or a neutralized derivative thereof.

According to a seventh embodiment, the home care composition of any of the fourth to sixth embodiment, wherein the fatty acid is a $C_{16}$-$C_{18}$ fatty acid and/or a neutralized derivative thereof.

According to an eight embodiment 8, the home care composition of any of the fourth to the seventh embodiment, wherein the fatty acid comprises caproic acid, capric acid, caprylic acid, oleic acid, linoleic acid, myristic acid, lauric acid, palmitic acid, stearic acids, behenic acid, a neutralized derivative thereof, or a combination of two or more thereof.

According to a ninth embodiment 9, the home care composition of any of the fourth or the eighth embodiment, wherein at least a portion of the total amount of fatty acid is neutralized.

According to a tenth embodiment, the home care composition of any foregoing embodiment, wherein the anionic surfactant comprises sodium laureth sulfate, ammonium laureth sulfate, disodium lauryl sulfosuccinate, disodium laureth sulfosuccinate, diammonium lauryl sulfosuccinate, diethylhexyl sodium sulfosuccinate, sodium oleyl succinate, sodium lauroyl methyl isethionate, sodium lauryl isethionate, sodium cocoyl isethionate, sodium laureth-5 carboxylate, lauryl ether carboxylic acid, ammonium lauryl sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, potassium lauryl sulfate, potassium laureth sulfate, ammonium cocoyl sulfate, ammonium lauroyl sulfate, sodium cocoyl sulfate, sodium lauroyl sulfate, potassium cocoyl sulfate, monoethanolamine cocoyl sulfate, sodium tridecyl benzene sulfonate, sodium dodecyl benzene sulfonate, sodium $C_{14}$-$C_{16}$ olefin sulfonate, sodium lauryl sarcosinate, sodium lauroyl sarcosinate, stearoyl sarcosine, lauryl sarcosine, cocoyl sarcosine, sodium methyl cocoyl taurate, sodium methyl lauroyl taurate, sodium lauroyl glutamate, sodium cocoyl glutamate, disodium cocoyl glutamate, potassium myristoyl glutamate, TEA-cocoyl glutamate, sodium cocoyl glycinate, potassium cocoyl glycinate, sodium cocoyl alaninate, TEA-cocoyl alaninate or a combination of two or more thereof.

According to an eleventh embodiment, the home care composition of the tenth embodiment, wherein the anionic surfactant comprises disodium lauryl sulfosuccinate, disodium laureth sulfosuccinate, diammonium lauryl sulfosuccinate, diethylhexyl sodium sulfosuccinate, sodium oleyl succinate, sodium lauroyl methyl isethionate, sodium lauryl isethionate, sodium cocoyl isethionate, sodium laureth-5 carboxylate, lauryl ether carboxylic acid, sodium tridecyl benzene sulfonate, sodium dodecyl benzene sulfonate, sodium $C_{14}$-$C_{16}$ olefin sulfonate, sodium lauryl sarcosinate, sodium lauroyl sarcosinate, stearoyl sarcosine, lauryl sarcosine, cocoyl sarcosine, sodium methyl cocoyl taurate, sodium methyl lauroyl taurate, sodium lauroyl glutamate, sodium cocoyl glutamate, disodium cocoyl glutamate, potassium myristoyl glutamate, TEA-cocoyl glutamate, sodium cocoyl glycinate, potassium cocoyl glycinate, sodium cocoyl alaninate, TEA-cocoyl alaninate, or a combination of two or more thereof.

According to a twelfth embodiment, the home care composition of the tenth embodiment, wherein the anionic surfactant comprises sodium laureth sulfate, ammonium laureth sulfate, ammonium lauryl sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, potassium lauryl sulfate, potassium laureth sulfate, ammonium cocoyl sulfate, ammonium lauroyl sulfate, sodium cocoyl sulfate, sodium lauroyl sulfate, potassium cocoyl sulfate, monoethanolamine cocoyl sulfate, or a combination of two or more thereof.

According to a thirteenth embodiment, the home care composition of any foregoing embodiment, wherein the non-ionic surfactant comprises a polyglycoside, alkoxylated fatty alcohols, alkyl(ether)phosphates, alkyl phosphate esters, or a combination of two or more thereof.

According to a fourteenth embodiment, the home care composition of any foregoing embodiment, wherein the non-ionic surfactant comprises an alky polyglycoside.

According to a fifteenth embodiment, the home care composition of the fourteenth embodiment, wherein the alkyl polyglycoside has at least one $C_8$-$C_{22}$ alkyl group.

According to a sixteenth embodiment, the home care composition of any of the thirteenth to fifteenth embodiment, wherein the polyglycoside is an alkyl polyglycoside having $C_{10}$-$C_{15}$ alkyl groups.

According to a seventh embodiment, the home care composition of any of the thirteenth to a sixteenth embodiment, wherein the polyglycoside comprises decyl glucoside.

According to a eighteenth embodiment, the home care composition of the thirteenth embodiment, wherein the alkoxylated fatty alcohol is selected from a di-alkyl alkoxylated fatty alcohol polymer, tri-alkyl alkoxylated fatty alcohol polymer, and a combination of two or more thereof.

According to a nineteenth embodiment, the home care composition of the thirteenth or eighteenth embodiment, wherein the alkyl group of the alkoxylated fatty alcohol has from about 12 carbon atoms to about 50 carbon atoms.

According to a twentieth embodiment, the home care composition of the thirteenth, eighteenth, or nineteenth embodiment, wherein the alkyl group of the alkoxylated fatty alcohol has from about 20 carbon atoms to about 26 carbon atoms.

According to a twenty-first embodiment, the home care composition according to the thirteenth embodiment, wherein the alkoxylated alkyl phosphate esters comprises PPG-5-ceteth-10 phosphate, oleth-3 phosphate, oleth-10 phosphate, ceteth-10 phosphate, dicetyl phosphate, cetyl phosphate, stearyl phosphate, or a combination of two or more thereof.

According to a twenty-second embodiment, the home care composition of any foregoing embodiment comprising an amphoteric surfactant selected from betaines, sultaines, amphoacetates, amphoproprionates, or a combination of two or more thereof.

According to a twenty-third embodiment, the home care composition of the twenty-second embodiment, wherein the amphoteric surfactant is selected from $C_8$-$C_{20}$ alkylbetaines, $C_8$-$C_{20}$ alkylamido($C_1$-$C_6$)alkylbetaines, sulfobetaines, $C_8$-$C_{20}$ alkylsulfobetaines, $C_8$-$C_{20}$ alkylamido($C_1$-$C_6$)alkylsulfobetaines, $C_8$-$C_{20}$ alkylamphoacetate, $C_8$-$C_{20}$ alkylamphodiacetate, a salt thereof, and a combination of two or more thereof.

According to a twenty-fourth embodiment, the home care composition of any foregoing embodiment further comprising from about 0.1 to about 20 wt. % of a thickening agent.

According to a twenty-fifth embodiment, the home care composition of the twenty-fourth embodiment, wherein the thickening agent comprises an acrylate polymer, polymeric gums, polysaccharides, microfibrous cellulose, gellan gum, pectine, alginate, arabinogalactan, carageenan, xanthum gum, guar gum, rhamsan gum, furcellaran gum, or a combination of two or more thereof.

According to a twenty-sixth embodiment, the home care composition of the twenty-fifth embodiment, wherein the acrylate polymer is selected from polyacrylates, methacrylates, crosslinked acrylic acid polymers, and a combination of two or more thereof.

According to a twenty-seventh embodiment, the home care composition of any foregoing embodiment further comprising from about 0.1 to about 20 wt. % of a structuring agent.

According to a twenty-eighth embodiment, the home care composition of the twenty-seventh embodiment, wherein the structuring agent comprises a clay.

According to a twenty-ninth embodiment, the home care composition of the twenty-eighth embodiment, wherein the clay comprises kaolin, kaolinite, dickite, halloysite, nacrite, smectite, montmorillonite, nontronite, illite, bentonite, attapulgite, palygorskite, sepiolite, hormite, pyrophyllite, chlorite, aluminosilicates, synthetic layered clays, or a combination of two or more thereof.

According to a thirtieth embodiment, the home care composition of any foregoing embodiment further comprising about 0.1 to about 20 wt. % of polyol.

According to a thirty-first embodiment, the home care composition of the thirtieth embodiment, wherein the polyol comprises a glycol.

According to a thirty-second embodiment, the home care composition of the thirtieth embodiment, wherein the glycol is selected from ethylene glycol, propylene glycol, butylene glycol, pentylene glycol, hexylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, caprylyl glycol, 1,2-hexanediol, 1,2-pentanediol, and 4-methyl-1,2-pentanediol, and a combination of two or more thereof.

According to a thirty-third embodiment, the home care composition of any foregoing embodiment, wherein the alpha hydroxy acid and/or a salt thereof is selected from levulinic acid, lactic acid, glycolic acid, malic acid, tartaric acid, citric acid, a salt thereof, and a combination of two or more thereof.

According to a thirty-fourth embodiment, the home care composition of any foregoing embodiment, wherein the alpha hydroxy acid comprises levulinic acid and/or a salt thereof.

According to a thirty-sixth embodiment, the home care composition of any foregoing embodiment further comprising one or more acid other than an alpha hydroxy acid.

According to a thirty-seventh embodiment, the home care composition according to the thirty-sixth embodiment, wherein the one or more acid other than an alpha hydroxy acid comprises sulfonic acid, sulfamic acid, urea hydrochloride acid, phosphoric acid, boric acid, lauric acid, a salt thereof, or a combination of two or more thereof.

In accordance with a thirty-eight embodiment, provided is a home care composition comprising:

a preservative system comprising:

(i) an alpha hydroxy acid and/or a salt thereof, (ii) one or more acid other than an alpha hydroxy acid; and from about 1 to about 25 wt. % of a surfactant system comprising:

(i) an anionic surfactant, (ii) a non-ionic surfactant, and (iii) optionally, an amphoteric surfactant, wherein the home care composition has a Micro Robustness Index of 0.85 or greater, and all weight percentages are based on the total weight of the home care composition.

According to a thirty-ninth embodiment, the home care composition of the thirty-eighth embodiment, wherein the one or more acid other than an alpha hydroxy acid comprises sulfonic acid, sulfamic acid, urea hydrochloride acid, phosphoric acid, boric acid, lauric acid, a salt thereof, or a combination of two or more thereof.

According to a fortieth embodiment, the home care composition of the thirty-eighth or thirty-ninth embodiment, wherein the home care composition is free of lactic acid.

According to a forty-first embodiment, the home care composition according to one of the thirty-eight to fortieth embodiment, wherein the preservative system comprises citric acid and/or a salt thereof and sulfonic acid and/or a salt thereof.

According to a forty-second embodiment, the home care composition according to one of the thirty-eight to fortieth embodiment, wherein the wherein the preservative system comprises levulinic acid and/or a salt thereof.

EXAMPLES

Example 1

Eight exemplary compositions (Example Compositions A-H) were prepared in accordance with aspects of the invention. The formulations for Example Compositions A-H are shown in Table 1, below. The pH for each of Example Compositions A-H was between 4 and 4.5.

TABLE 1

| US INCI Compound Name | Ex. A (wt. %) | Ex. B (wt. %) | Ex. C (wt. %) | Ex. D (wt. %) | Ex. E (wt. %) | Ex. F (wt. %) | Ex. G (wt. %) | Ex. H (wt. %) |
|---|---|---|---|---|---|---|---|---|
| SODIUM LAURETH SULFATE | 1.67 | 1.67 | 1.67 | 1.67 | 1.67 | 1.67 | 1.67 | 1.67 |
| DECYL GLUCOSIDE | 0.26 | 0.26 | 0.26 | 0.26 | 0.26 | 0.26 | 0.26 | 0.26 |
| SODIUM CHLORIDE | 0.2 | 0.2 | 0.2 | 0.2 | 0.2 | 0.2 | 0.2 | 0.2 |
| SODIUM HYDROXIDE | 0.18 | 0.18 | 0.18 | 0.18 | 0.18 | 0.18 | 0.18 | 0.18 |
| CITRIC ACID | 0.15 | 0.15 | 0.15 | 0.15 | 0.15 | 0.15 | 0.15 | 0.15 |
| LEVULINIC ACID | 0.5 | 0.4 | 0.3 | 0.2 | 0.5 | 0.4 | 0.3 | 0.2 |
| FRAGRANCE 1 | 0.53 | 0.53 | 0.53 | 0.53 | | | | |
| FRAGRANCE 2 | | | | | 0.6 | 0.6 | 0.6 | 0.6 |
| VIOLET COLORANT | <0.001 | <0.001 | <0.001 | <0.001 | | | | |
| BLUE COLORANT | <0.001 | <0.001 | <0.001 | <0.001 | <0.001 | <0.001 | <0.001 | <0.001 |
| WATER | Q.S. to 100 | Q.S. to 100 | Q.S. to 100 | Q.S. to 100 | Q.S. 100 | Q.S. 100 | Q.S. 100 | Q.S. 100 |

Example 2

Example Compositions A-H were evaluated to assess the microbial growth of bacteria within each composition. Specifically, Example Compositions A-H were evaluated using a standard Micro Robustness test and expressed on a Micro Robustness Index ("MRI"). The MRI test evaluated the microbial growth of standard bacteria pool containing: *Burkholderia cepacia* ATCC 10856; *Enterobacter cloacae* PLS 237; *Escherichia coli* ATCC 8739; *Klebsiella oxytoca* PLS 104B; *Klebsiella pneumoniae* PLS 113; *Serratia marcescens* PLS 201; *Providencia rettgeri* PLS 200; *Pseudomonas aeruginosa* ATCC 15442; *Pseudomonas putida* PLS 111; *Staphylococcus aureus* ATCC 6538; and *Staphylococcus saprophyticus* PLS 110B. For liquids (excluding mouthwashes) and dical based dentifrices, a 9 gram sample of each of Example Compositions A-H was inoculated by adding 1.0 mL of the bacteria inoculum at time 0 hours (first inoculation). Each inoculated sample was then thoroughly mixed using a sterile wooden stick or other sterile stirrer. A MRI value of 0.85 is generally considered to be robust and, thus, suitable for home care compositions.

The results of the Micro Robustness Index evaluation are shown in FIGURE. Each of Example Compositions A-H had a MRI value of 0.85 or greater. Surprisingly, the lowest MRI value was 1.35, about 159% greater than the minimal value for constituting a "robust" effect.

Example 3

An exemplary compositions (Example Compositions I) was prepared in accordance with aspects of the invention. The formulation for Example Composition I is shown in Table 2. The pH of Example Composition I was 3.7.

TABLE 2

| US INCI Compound Name | Ex. I (wt. %) |
|---|---|
| Sulfonic Acid | 8.8 |
| Citric Acid | 0.4 |
| Caustic Soda | 0.9 |
| Sodium Laureth Sulfate 1 EO | 4 |
| Ethanol | 0.6 |
| Cocamidopropyl betaine | 6.65 |
| $C_{9-11}$ Alcohol OE 7.5-8:1 | 0.5 |
| Miscellaneous (colorants, fragrance, preservatives, etc.) | <0.5 |
| Water | Q.S. to 100 |

What is claimed is:

1. A home care composition comprising:

a preservative system comprising an alpha hydroxy acid and/or a salt thereof; from about 1 to about 20 wt. % of a surfactant system comprising:

(i) an anionic surfactant comprising sodium laureth sulfate, (ii) a non-ionic surfactant comprising decyl glucoside, and (iii) optionally, an amphoteric surfactant;

water, and one or more optional components selected from sodium chloride, sodium hydroxide, a fragrance, and a colorant;

wherein the preservative system comprises a first alpha hydroxy acid which is levulinic acid and/or a salt thereof present in an amount of from 0.2 wt. % to 0.5 wt. %, and a second alpha hydroxy acid comprising citric acid; wherein the levulinic acid and/or a salt thereof and the second alpha hydroxy acid and/or a salt thereof have a weight ratio of from 0.2:0.15 to 0.5:0.15; and wherein the home care composition has a Micro Robustness Index of 0.85 or greater, and all weight percentages are based on the total weight of the home care composition.

2. The home care composition of claim 1 further comprising: from about 0.1 to about 30 wt. % of a fatty acid and/or a neutralized derivative thereof, wherein the fatty acid comprises caproic acid, capric acid, caprylic acid, oleic acid, linoleic acid, myristic acid, lauric acid, palmitic acid, stearic acids, behenic acid, a neutralized derivative thereof, or a combination of two or more thereof.

3. The home care composition of claim 1, wherein the anionic surfactant further comprises ammonium laureth sulfate, disodium lauryl sulfosuccinate, disodium laureth sulfosuccinate, diammonium lauryl sulfosuccinate, diethylhexyl sodium sulfosuccinate, sodium oleyl succinate, sodium lauroyl methyl isethionate, sodium lauryl isethionate, sodium cocoyl isethionate, sodium laureth-5 carboxylate, lauryl ether carboxylic acid, ammonium lauryl sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, potassium lauryl sulfate, potassium laureth sulfate, ammonium cocoyl sulfate, ammonium lauroyl sulfate, sodium cocoyl sulfate, sodium lauroyl sulfate, potassium cocoyl sulfate, monoethanolamine cocoyl sulfate, sodium tridecyl benzene sulfonate, sodium dodecyl benzene sulfonate, sodium $C_{14}$-$C_{16}$ olefin sulfonate, sodium lauryl sarcosinate, sodium lauroyl sarcosinate, stearoyl sarcosine, lauryl sarcosine, cocoyl sarcosine, sodium methyl cocoyl taurate, sodium methyl lauroyl taurate, sodium lauroyl glutamate, sodium cocoyl glutamate, disodium cocoyl glutamate, potassium myristoyl glutamate, TEA-cocoyl glutamate, sodium cocoyl glycinate, potassium cocoyl glycinate, sodium cocoyl alaninate, TEA-cocoyl alaninate, or a combination of two or more thereof.

4. The home care composition of claim 3, wherein the anionic surfactant further comprises ammonium laureth sulfate, ammonium lauryl sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, potassium lauryl sulfate, potassium laureth sulfate, ammonium cocoyl sulfate, ammonium lauroyl sulfate, sodium cocoyl sulfate, sodium lauroyl sulfate, potassium cocoyl sulfate, monoethanolamine cocoyl sulfate, or a combination of two or more thereof.

5. The home care composition of claim 1, wherein the non-ionic surfactant further comprises a polyglycoside other than decyl glucoside, alkoxylated fatty alcohols, alkyl(ether) phosphates, alkyl phosphate esters, or a combination of two or more thereof.

6. The home care composition of claim 5, wherein the polyglycoside is an alkyl polyglycoside having $C_{10}$-$C_{15}$ alkyl groups other than decyl glucoside.

7. The home care composition of claim 5, wherein the alkoxylated fatty alcohol is selected from a di-alkyl alkoxylated fatty alcohol polymer, tri-alkyl alkoxylated fatty alcohol polymer, and a combination of two or more thereof.

8. The home care composition of claim 5, wherein the alkoxylated alkyl phosphate esters comprises PPG-5-ceteth-10 phosphate, oleth-3 phosphate, oleth-10 phosphate, ceteth-10 phosphate, dicetyl phosphate, cetyl phosphate, stearyl phosphate, or a combination of two or more thereof.

9. The home care composition of claim 1 comprising an amphoteric surfactant selected from betaines, sultaines, amphoacetates, amphoproprionates, or a combination of two or more thereof.

10. The home care composition of claim 9, wherein the amphoteric surfactant is selected from $C_8$-$C_{20}$ alkylbetaines, $C_8$-$C_{20}$ alkylamido($C_1$-$C_6$) alkylbetaines, sulfobetaines, $C_8$-$C_{20}$ alkylsulfobetaines, $C_8$-$C_{20}$ alkylamido($C_1$-$C_6$)alkylsulfobetaines, $C_8$-$C_{20}$ alkylamphoacetate, $C_8$-$C_{20}$ alkylamphodiacetate, a salt thereof, and a combination of two or more thereof.

11. The home care composition of claim 1 further comprising from about 0.1 to about 20 wt. % of a thickening agent selected from an acrylate polymer, polymeric gums, polysaccharides, microfibrous cellulose, gellan gum, pectine, alginate, arabinogalactan, carageenan, xanthum gum, guar gum, rhamsan gum, furcellaran gum, and a combination of two or more thereof.

12. The home care composition of claim 1 further comprising from about 0.1 to about 20 wt. % of a structuring agent comprising a clay selected from kaolin, kaolinite, dickite, halloysite, nacrite, smectite, montmorillonite, nontronite, illite, bentonite, attapulgite, palygorskite, sepiolite, hormite, pyrophyllite, chlorite, aluminosilicates, synthetic layered clays, and a combination of two or more thereof.

13. The home care composition of claim 1, wherein the second alpha hydroxy acid further comprises lactic acid, glycolic acid, malic acid, tartaric acid, or a combination of two or more thereof.

14. The home care composition of claim 1, wherein the second alpha hydroxy acid is citric acid;

wherein the levulinic acid and/or a salt thereof and the citric acid and/or a salt thereof have a weight ratio of 0.5:0.15.

15. The home care composition of claim 1 further comprising one or more acid other than an alpha hydroxy acid selected from sulfonic acid, sulfamic acid, urea hydrochloride acid, phosphoric acid, boric acid, lauric acid, a salt thereof, and a combination of two or more thereof.

16. A home care composition comprising:

a preservative system comprising:

(i) an alpha hydroxy acid and/or a salt thereof, (ii) one or more acid other than an alpha hydroxy acid;

from about 1 to about 20 wt. % of a surfactant system comprising:

(i) an anionic surfactant comprising sodium laureth sulfate, (ii) a non-ionic surfactant comprising decyl glucoside, and (iii) optionally, an amphoteric surfactant, water; and one or more optional components selected from sodium chloride, sodium hydroxide, fragrance, and a colorant;

wherein the preservative system comprises a first alpha hydroxy acid which is levulinic acid and/or a salt thereof present in an amount of from 0.2 wt. % to 0.5 wt. %, and a second alpha hydroxy acid comprising citric acid; wherein the levulinic acid and/or a salt thereof and the second alpha hydroxy acid and/or a salt thereof have a weight ratio of from 02:0.15 to 0.5:0.15; and wherein the home care composition has a Micro Robustness Index of 0.85 or greater, and all weight percentages are based on the total weight of the home care composition.

17. The home care composition of claim 16, wherein the one or more acid other than an alpha hydroxy acid comprises sulfonic acid, sulfamic acid, urea hydrochloride acid, phosphoric acid, boric acid, lauric acid, a salt thereof, or a combination of two or more thereof.

18. The home care composition of claim 16, wherein the home care composition is free of lactic acid.

19. The home care composition or claim 16, wherein the preservative system comprises sulfonic acid and/or a salt thereof.

20. The home care composition of claim 16, wherein the second alpha hydroxy acid is citric acid;

wherein the levulinic acid and/or a salt thereof and the citric acid and/or a salt thereof have a weight ratio of 0.5:0.15.

* * * * *